Patented May 10, 1938

2,116,499

UNITED STATES PATENT OFFICE 2,116,499

SYNTHETIC RESINS AND PREPARATION OF SAME

Julius Hyman, Chicago, Ill., assignor to Velsicol Corporation, Chicago, Ill., a corporation of Illinois No Drawing. Application February 10, 1936, Serial No. 63,220

1 Claim. (Cl. 260—2)

This invention relates to a new and useful improvement in the manufacture of pale synthetic resins by the treatment of unsaturated hydrocarbon vapors with granular polymerizing contact catalysts.

My U. S. Patent, No. 1,919,722, issued July 25, 1933, deals with the production of pale synthetic resins by the vapor phase treatment of low-boiling pale-colored fractions of vapor phase cracked gasoline with various catalysts, such as fuller's earth and sulfuric acid. In the vapor phase treatment of low-boiling fractions of vapor phase cracked gasoline with granular polymerizing adsorbent catalysts, such as fuller's earth, it has been found that, as a run progresses, the color of the resulting polymer gradually becomes deeper in tone.

I have found that the deepening in tone of the polymers may be retarded or prevented by saturating the gasoline vapors to be treated with moisture at the temperature of the gasoline vapors and the pressure naturally present in the system.

A satisfactory method for the saturation of the gasoline vapors with moisture is to spray into a small chamber through which the gasoline vapors are passing prior to their polymerization a stream of water, preheated to the temperature of the gasoline vapors, or slightly above it. The excess water is drained from the base of the chamber. By this means the gasoline vapors become saturated with moisture almost instantaneously, without danger of condensation of the gasoline vapors, or supersaturation of the vapors with moisture. I do not, however, wish to limit this invention to the method just mentioned, the example having been merely illustrative.

As this invention depends upon saturation with moisture of the gasoline vapors, it is essential that the treatment with water vapor take place at a temperature below the boiling point of water at the pressure of the hydrocarbon vapors.

I claim as my invention:

In a process for producing synthetic resins by polymerizing unsaturated cracked hydrocarbon vapors through the agency of granular adsorbent catalysts, the improvement which comprises saturating said vapors with water vapor prior to polymerization.

JULIUS HYMAN.

CERTIFICATE OF CORRECTION.

Patent No. 2,116,499.                                                May 10, 1938.

JULIUS HYMAN.

It is hereby certified that the name of the assignee in the above numbered patent was erroneously written and printed as "Velsical Corporation" whereas said name should have been written and printed as Velsicol Corporation, of Chicago, Illinois, a corporation of Illinois, as shown by the records of assignments in this office; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.